United States Patent
Kaneko

(10) Patent No.: US 7,679,687 B2
(45) Date of Patent: Mar. 16, 2010

(54) DIGITAL TERRESTRIAL TV BROADCAST SIGNAL RECEIVING SYSTEM AND DIGITAL TERRESTRIAL TV BROADCAST SIGNAL RECEIVER

(75) Inventor: Mayumi Kaneko, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1095 days.

(21) Appl. No.: 11/332,299

(22) Filed: Jan. 17, 2006

(65) Prior Publication Data

US 2006/0158376 A1 Jul. 20, 2006

(30) Foreign Application Priority Data

Jan. 17, 2005 (JP) ............... 2005-009639

(51) Int. Cl.
H04N 5/44 (2006.01)
H04N 5/50 (2006.01)
H04N 5/268 (2006.01)

(52) U.S. Cl. .................. 348/725; 348/706; 348/731

(58) Field of Classification Search ........... 348/705, 348/706, 725, 731; 725/150
See application file for complete search history.

(56) References Cited

U.S. PATENT DOCUMENTS

| | | | | |
|---|---|---|---|---|
| 4,935,814 A * | 6/1990 | Omoto et al. | ............... | 348/193 |
| 6,016,120 A * | 1/2000 | McNabb et al. | ........ | 342/357.06 |
| 6,774,863 B2 | 8/2004 | Shirosaka et al. | | |
| 6,940,404 B2 * | 9/2005 | Nagao et al. | ............. | 340/539.25 |
| 7,242,424 B2 * | 7/2007 | Lee | ............. | 348/180 |
| 7,561,213 B2 * | 7/2009 | Okamoto | ............. | 348/725 |
| 2002/0036718 A1 * | 3/2002 | Lee | ............. | 348/731 |
| 2002/0051085 A1 * | 5/2002 | Lee | ............. | 348/570 |
| 2002/0083458 A1 * | 6/2002 | Henderson et al. | ........... | 725/72 |
| 2003/0228857 A1 * | 12/2003 | Maeki | ............. | 455/278.1 |
| 2004/0183911 A1 * | 9/2004 | Lee | ............. | 348/192 |
| 2006/0125708 A1 * | 6/2006 | Narita | ........... | 343/818 |

(Continued)

FOREIGN PATENT DOCUMENTS

JP 53-082247 7/1978

(Continued)

OTHER PUBLICATIONS

Japanese Office Action dated Oct. 30, 2007 w/English translation (six (6) pages).

(Continued)

*Primary Examiner*—Brian P Yenke
(74) *Attorney, Agent, or Firm*—Crowell & Moring LLP

(57) ABSTRACT

In a digital terrestrial TV broadcast signal receiving system comprised of a multi-directional antenna and a TV broadcast signal receiver which are connected by a cable, even when a level of a TV broadcast signal is lower and S/N is lower, signal receiving condition is made stable with no relation to locations of the multi-directional antenna and the TV broadcast signal receiver, a length of the cable, and so on. The multi-directional antenna has a variable amplifier which can be controlled a gain from the TV broadcast signal receiver and amplifies a received TV broadcast signal. The TV broadcast signal receiver detects a level of a TV broadcast signal outputted from the multi-directional antenna, and controls the gain of the variable amplifier corresponding to the detected level of the TV broadcast signal.

6 Claims, 3 Drawing Sheets

U.S. PATENT DOCUMENTS

| | | | |
|---|---|---|---|
| 2006/0142056 A1* | 6/2006 | Suenaga et al. | 455/556.1 |
| 2006/0145918 A1* | 7/2006 | Henderson et al. | 342/359 |
| 2007/0044125 A1* | 2/2007 | Lee | 725/72 |
| 2007/0236571 A1* | 10/2007 | Lee | 348/192 |
| 2008/0089452 A1* | 4/2008 | Henderson et al. | 375/346 |

FOREIGN PATENT DOCUMENTS

| | | |
|---|---|---|
| JP | 57-042218 | 3/1982 |
| JP | 2-13020 A | 1/1990 |
| JP | 09-093509 | 4/1997 |
| JP | 11-289499 | 10/1999 |
| JP | 2004-165860 A | 6/2004 |
| JP | 2004-173062 A | 6/2004 |
| JP | 2004-193723 | 7/2004 |

OTHER PUBLICATIONS

Japanese Office Action dated Mar. 5, 2007 with English translation (Four (4) Pages).

* cited by examiner

DIGITAL TERRESTRIAL TV BROADCAST SIGNAL RECEIVING SYSTEM AND DIGITAL TERRESTRIAL TV BROADCAST SIGNAL RECEIVER

BACKGROUND OF THE INVENTION

1. Field of the Invention

The present invention relates to a digital terrestrial TV (television) broadcast signal receiving system which uses a multi-directional antenna called smart antenna and a digital terrestrial TV broadcast signal receiver suitable for the system. Especially, the present invention relates to digital terrestrial TV broadcast signal receiving system and receiver capable of remote control of gain of an amplifier built in the multi-directional antenna. In this description, the digital terrestrial TV broadcast signal receiving system and receiver are abbreviated as TV broadcast signal receiving system and TV broadcast signal receiver as appropriate.

2. Description of the Related Art

In the North American Continent where an ATSC digital television broadcast (it is abbreviated to a hereinafter digital TV broadcast) is performed, plains are dotted with metropolises, so that various digital TV broadcast signals broadcasted in the suburbs of each metropolis can be received at other cities or the halfway point of the cities. In consideration from a user who receives the TV broadcast signals, since many TV broadcast signals are transmitted in various directions, it is necessary to regulate a direction of an antenna in an orientation to a TV broadcasting station from which a program which he wants to watch is delivered. Therefore, a multi-directional antenna such as a smart antenna is put into practical use.

The digital terrestrial TV broadcast has a characteristic that when an intensity of received signal of a digital TV broadcast signal is equal to or larger than a predetermined threshold value, an image having a predetermined image quality can be obtained by correction. Thus, it is possible to watch TV programs of various channels with using a multi-directional antenna.

Generally, the multi-directional antenna is installed in an outdoor space, a TV broadcast signal receiver having functions of a tuner and a decoder is disposed in an indoor, and the multi-directional antenna and the TV broadcast signal receiver are connected by cables. The level of the TV broadcast signal outputted from the multi-directional antenna is varied from low level near to a threshold to very high level corresponding to signal receiving condition. Therefore, the TV broadcast signal receiver adjusts a gain of an amplifier for amplifying the TV broadcast signal corresponding to the level of the TV broadcast signal outputted from the multi-directional antenna. Although the amplifier is provided on the multi-directional antenna, the gain of the amplifier is fixed in the multi-directional antenna marketed at present.

Since the multi-directional antenna and the TV broadcast signal receiver are connected by the cables, it is inevitable that noise is superimposed on the TV broadcast signal transmitted through the cable. Therefore, when the level of the TV broadcast signal is lower, the S/N, which is originally lower, is further reduced by the noise superimposed on the TV broadcast signal while it is transmitted through the cables. Even if the TV broadcast signal that the S/N is reduced is amplified and performed a signal correction process such as filtering in the TV broadcast signal receiver, the noise may not be removed sufficiently so that quality of an image displayed on a screen of a display apparatus may be deteriorated. Furthermore, the level of the noise superimposed on the TV broadcast signal is varied corresponding to the locations of the multi-directional antenna and the TV broadcast signal receiver, the lengths of the cables, and so on. Therefore, even when the same combination of the multi-directional antenna and the TV broadcast signal receiver is used, the signal receiving condition of a specific cannel becomes unstable corresponding to the installation condition of the multi-directional antenna, so that the TV programs of the specific channel may not be watched.

On the other hand, Japanese Laid-Open Patent Publication No. 11-289499 discloses a TV receiver having two tuners in which a gain of a distributor for distributing TV broadcast signals into two ways is adjusted in optimum state with respect to each channel. A difference between levels of TV broadcast signals of a reception channel and an adjoining cannel. When the level of the TV broadcast signal of the adjoining channel is higher than that of the reception channel, there may be a possibility that the TV broadcast signal of the reception channel is intercepted by the TV broadcast signal of the adjoining channel. Therefore, the gain of the distributor is set to be lower. Alternatively, when the level of the TV broadcast signal of the adjoining channel is lower than that of the reception channel, the gain of the distributor is set to be higher so as to increase the S/N.

Japanese Laid-Open Patent Publication No. 9-93509 discloses a TV broadcast signal receiving apparatus for mobile such as an automobile having a high frequency amplifying circuit and an intermediate frequency of amplifying circuit capable of gain adjustment, and a means for correcting frequency characteristic of the intermediate frequency amplifying circuit for improving multipath disturbance caused by reflected wave from a structure such as a building. When the frequency characteristic of the intermediate frequency amplifying circuit is corrected, a start point of the gain control of the high frequency amplifying circuit is shifted to a side where a level of an input signal is higher.

Japanese Laid-Open Patent Publication No. 2004-193723 discloses an intermediate frequency processor which can receive a TV broadcast signal and an FM radio broadcast signal. When the FM radio broadcast signal is received, an operation of a VIF amplifier is switched off by a control signal from outside.

Japanese Laid-Open Patent Publication No. 57-42218 discloses a delayed automatic gain control circuit comprising a first automatic gain control circuit and a second automatic gain control circuit which operates when an output of the first automatic gain control circuit exceeds a predetermined threshold value. The second automatic gain control circuit is configured by a circuit for detecting a peak value by taking out a difference between a peak value of the output of the first automatic gain control circuit and the threshold vale, so that variation and reduction of a loop gain is prevented.

By the way, it is an inherent problem of the digital terrestrial TV broadcast that the signal receiving condition becomes unstable due to the locations of the multi-directional antenna and the TV broadcast signal receiver and the lengths of the cables, and thereby the TV program of a specific channel may not be watched. Therefore, the problem cannot be solved by applying the conventional techniques described in the above-mentioned documents.

SUMMARY OF THE INVENTION

The present invention is conceived to solve the above-mentioned problems of the conventional one, and purposed to provide a digital terrestrial TV broadcast signal receiving system by which signal receiving condition becomes stable with no relation to locations of a multi-directional antenna and a TV broadcast signal receiver and lengths of cables, and to provide a digital terrestrial TV broadcast signal receiver which is suitable for the system.

A digital terrestrial TV broadcast signal receiving system in accordance with an aspect of the present invention comprises a multi-directional antenna and a TV broadcast signal receiver which are connected by cables. The multi-directional antenna has a variable amplifier which can be controlled gain adjustment from the TV broadcast signal receiver, and amplifies a received TV broadcast signal. And the TV broadcast signal receiver can detect a level of the TV broadcast signal outputted from the multi-directional antenna, and control the gain of the variable amplifier corresponding to the detected level.

By such a configuration, the gain of the variable amplifier of the multi-directional antenna is adjusted corresponding to the level of the TV broadcast signal actually received by the multi-directional antenna. Thus, even when a level of a TV broadcast signal is lower and S/N is lower, signal receiving condition is made stable with no relation to locations of the multi-directional antenna and the TV broadcast signal receiver, a length of the cable, and so on.

A digital terrestrial TV broadcast signal receiver in accordance with another aspect of the present invention is connected to a multi-directional antenna having a variable amplifier which can be controlled gain adjustment from the TV broadcast signal receiver, and amplifies a received TV broadcast signal. The TV broadcast signal receiver can detect a level of the TV broadcast signal outputted from the multi-directional antenna, and control the gain of the variable amplifier corresponding to the detected level.

By such a configuration, the TV broadcast signal receiver suitable for the above-mentioned digital terrestrial TV broadcast signal receiving system can be provided.

In the above-mentioned configuration, it is preferable that the TV broadcast signal receiver stores at least one look-up table which is referred based on the received TV broadcast signal and outputs a gain control signal obtained from the look-up table, and the gain of the variable amplifier is adjusted corresponding to the gain control signal.

By such a configuration, the gain control of the variable amplifier can be made simple and reliable.

DETAILED DESCRIPTION OF THE EMBODIMENT

A digital terrestrial TV broadcast signal receiving system and a digital terrestrial TV broadcast signal receiver suitable for the system in accordance with an embodiment of the present invention are described with reference to figures.

Figure 1:
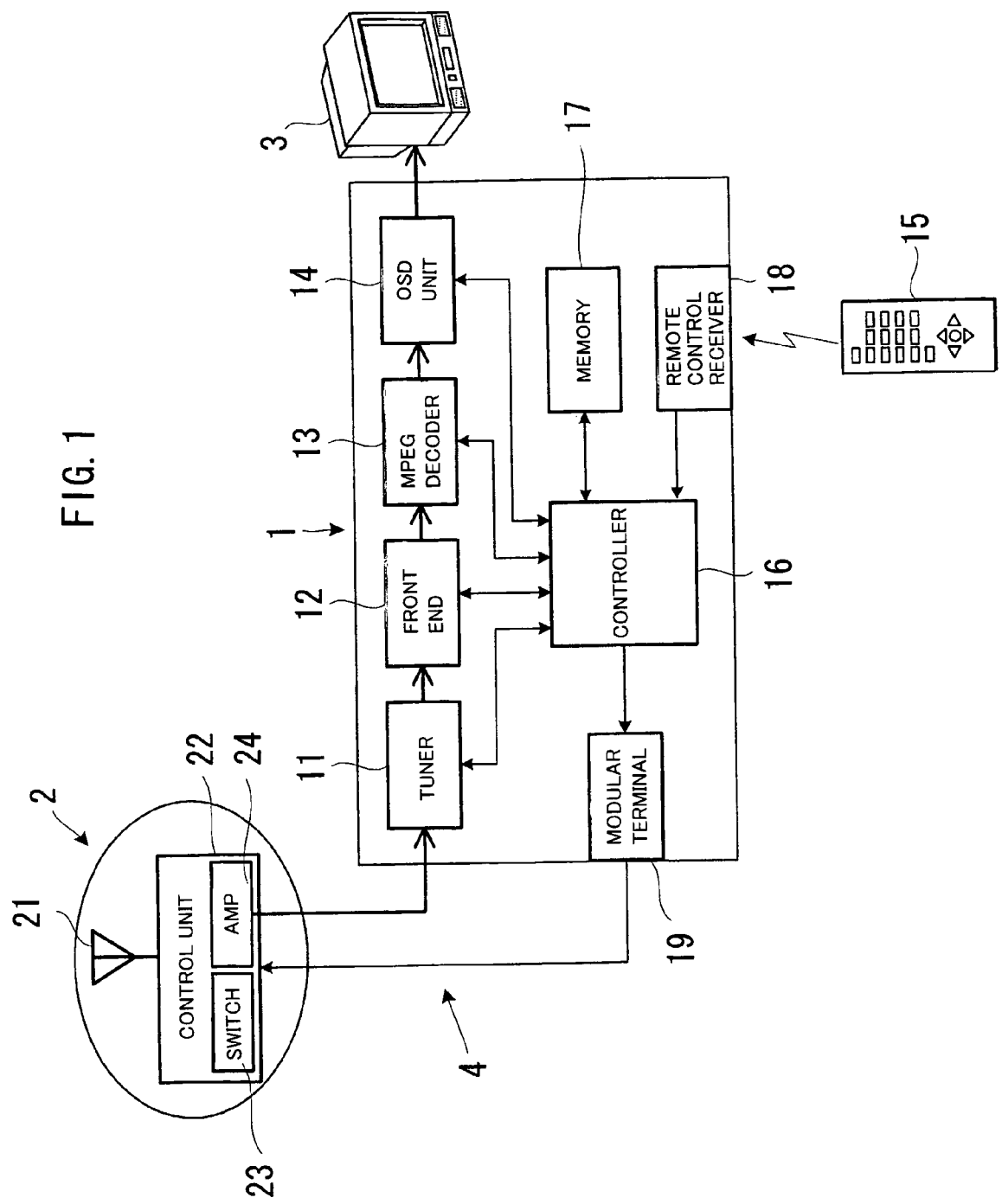
FIG. 1 is a block diagram showing a configuration of a digital terrestrial TV broadcast signal receiving system including a digital terrestrial TV broadcast signal receiver in accordance with an embodiment of the present invention.

FIG. 1 shows a configuration of the digital terrestrial TV broadcast signal receiving system in accordance with the embodiment. This system is configured by a digital terrestrial TV broadcast signal receiving apparatus for example, a set-top box 1 located in an indoor space, a multi-directional antenna 2 located in an outdoor space, a display apparatus 3 connected to the TV broadcast signal receiver 1, cables 4 connected between the multi-directional antenna 2 and the TV broadcast signal receiver 1, and so on.

The TV broadcast signal receiver 1 is configured by the following elements. A tuner 11 receives a TV broadcast signal which serves as a TV broadcast signal receiving means. An ATSC front end 12 performs a predetermined signal processing to a digital TV broadcast signal received by the tuner 11 and decodes the digital TV broadcast signal. An MPEG decoder 13 decodes the TV broadcast signal which is compressed in compliance with the MPEG technical standard, which serves as a TV broadcast signal processing means. An on-screen display unit (OSD) 14 superimposes a predetermined display image on the TV broadcast signal, which serves as a TV broadcast signal output means. A controller 16 detects signal receiving condition of the TV broadcast signal received by the tuner 11, and controls the ATSC front end 13, the MPEG decoder 13, and so on, which serves as an entire control means. A memory 17 temporarily memorizes the decoded TV broadcast signal, and memorizes the display image to be superimposed on the decoded TV broadcast signal, which serves as a memory means. A remote control signal receiver 18 receives a signal from a remote control apparatus 15. A modular terminal 19 is connected to the cable 4. The TV broadcast signal decoded by the MPEG decoder 13 is outputted to the display apparatus 3 through the on-screen display unit 14, and displayed on a screen of the display apparatus 3. The tuner comprises an amplifier (AGC: Automatic Gain Controller) in which a gain thereof can be adjusted automatically in the TV broadcast signal receiver 1 side.

The multi-directional antenna 2 is configured by an antenna main body 21 having, for example, sixteen signal receiving directions in compliance with a technical standard, and a control unit 22 for entirely controlling the antenna main unit 21. The control unit 22 further comprises a signal receiving direction switching device 23 selecting one among a plurality of signal receiving directions on the basis of a signal receiving direction control signal outputted from the TV broadcast signal receiver 1, which serves as a signal receiving direction switching means, and a variable amplifier 24 for amplifying a received TV broadcast signal, which serves as a variable amplifying means. The variable amplifier 24 can control a gain corresponding to a gain control signal transmitted from the TV broadcast signal receiver 1.

The controller 16 is configured by a ROM memorizing such as a control program, a CPU performing such as a control program, a timer, and so on. The controller 16 serves as a signal receiving direction deciding means, a signal receiving direction control signal output means, a signal level detection means, and a gain control signal output means, which will be described later. The controller 16 reads out data from the memory 17 and temporarily memorizes the data into the memory, as occasion demands. The memory 17 may be configured by not only a volatile memory such as a D-RAM, but also a non-volatile memory such as a hard disc drive apparatus, a flash memory, or the like. The cables 4 are configured by, for example, a coaxial cable which is formed by bundling a plurality of signal wires so that the TV broadcast signal can be transmitted from the multi-directional antenna 2 to the TV broadcast signal receiver 1 and the signal receiving direction control signal and the gain control signal can be transmitted from the TV broadcast signal receiver 1 to the multi-directional antenna 2.

Figure 2:
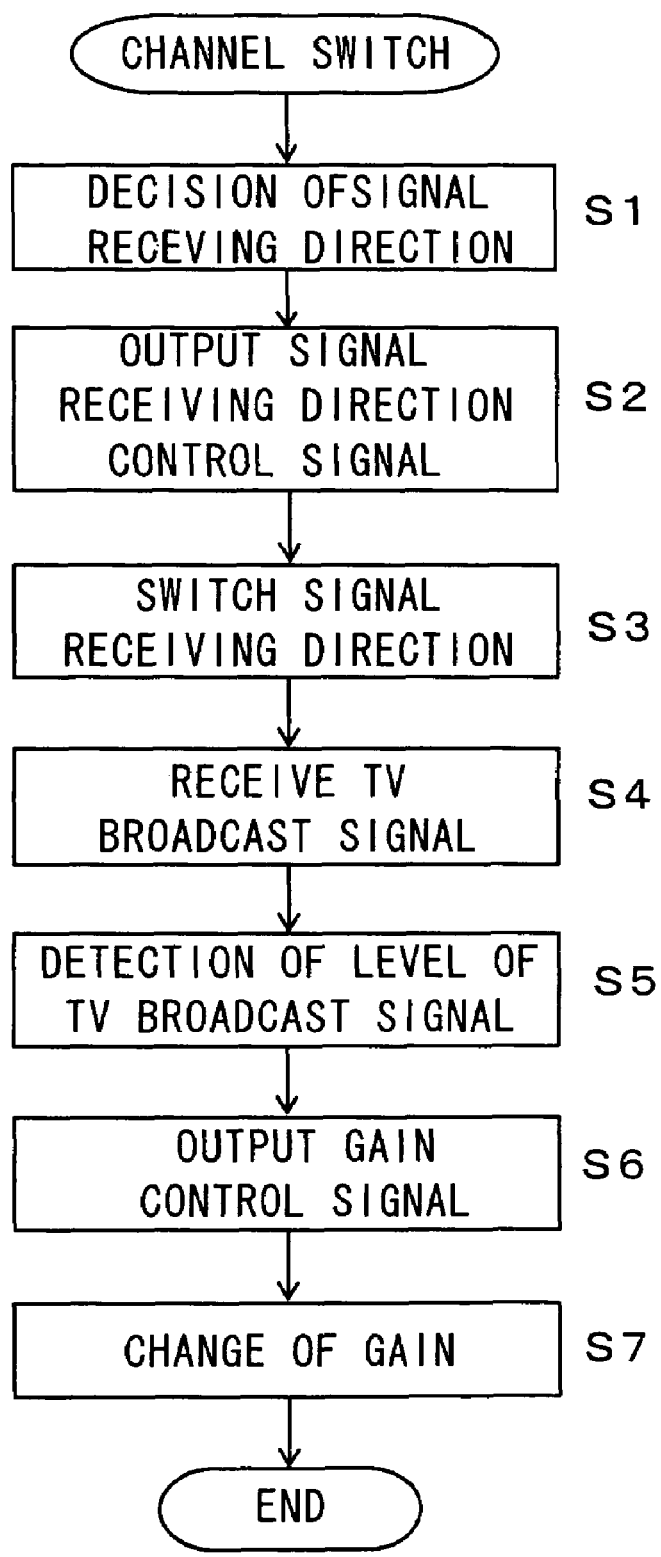
FIG. 2 is a flowchart showing a TV broadcast signal receiving motion of a digital terrestrial TV broadcast in the above-mentioned embodiment.

Subsequently, the TV broadcast signal receiving motion of the digital terrestrial TV broadcast in this embodiment id described with reference to a flowchart shown in FIG. 2. When a user operates the remote control apparatus 15 so as to switch the channel to be received, the remote control signal receiver 18 receives a signal transmitted from the remote control apparatus 15, and outputs a channel switching signal to the controller 16 corresponding to the received signal. The controller 16 serves as the signal receiving direction deciding means, and decides an optimum signal receiving direction of the selected channel with using information memorized in the memory 17 (S1).

In the digital terrestrial TV broadcast signal receiving system using the multi-directional antenna 2, TV broadcast signals of the same channel may be received in a plurality of signal receiving directions. Therefore, when the multi-directional antenna 2 is connected to the TV broadcast signal receiver 1 first, receivable channels are searched with respect to each signal receiving direction, and a level of a TV broadcast signal of each receivable channel is measured. Then, for example, a direction where the level of the TV broadcast signal of a specific channel is the highest is memorized as the optimum signal receiving direction of the specific channel in the memory 17.

When the signal receiving direction of the selected channel is decided, the controller 16 serves as a signal receiving direction control signal output means, and outputs a signal receiving direction control signal to the multi-directional antenna 2 for specifying a signal receiving direction to receive the TV broadcast signal (S2). The signal receiving direction switching device 23 of the multi-directional antenna 2 switches the effective signal receiving direction of the antenna main unit 21 to the specified signal receiving direction on the basis of the signal receiving direction control signal transmitted from the TV broadcast signal receiver 1 (S3). Thereby, the TV broadcast signal of the channel can be received in the optimum signal receiving direction (S4).

The TV broadcast signal received by the multi-directional antenna 2 is amplified or damped with the variable amplifier 24 if necessary, and outputed to the TV broadcast signal receiver 1 through the cable 4. When the channel is switched, the gain of variable amplifier 24 was adjusted corresponding to the level of the TV broadcast signal of the channel which was watched just before. Since it is unknown that the gain of the variable amplifier 24 is suitable for the level of the TV broadcast signal of the selected new channel, the controller 16 of the TV broadcast signal receiver 1 serves as a signal level detection means, and detects the level of the TV broadcast signal received by the tuner 11 (S5). At this time, the TV broadcast signal is amplified or damped by the gain of the variable amplifier 24 which is set at the time.

Figure 3:
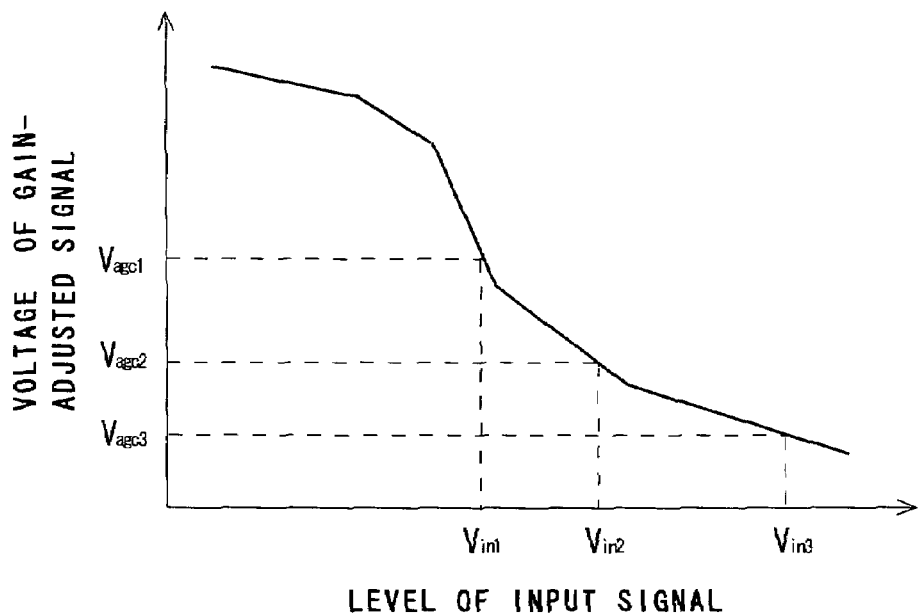
FIG. 3 is a graph showing a relation between a voltage of inputted TV broadcast signal and a level value of a signal corresponding to the voltage in the above-mentioned embodiment.

Specifically, the ROM of the controller 16 stores a look-up table in which a relationship between voltages of TV broadcast signals outputted from the tuner 11 and levels of input signals corresponding to it is written. Then, the controller 16 refers the look-up table on the basis of the TV broadcast signal received by the tuner 11, for example, a peak voltage of the TV broadcast signal, and outputs a level value of the input signal corresponding to the voltage of the received TV broadcast signal. In the look-up table, the voltages of inputted TV broadcast signals and the level values of the input signals corresponding to them are set with following to, for example, a characteristic curve shown in FIG. 3. In FIG. 3, the ordinate designates voltage values of the TV broadcast signals outputted from the amplifier (AGC) of the tuner which are processed the gain adjustment, and the abscissa designates level values of the input signals. For example, the voltage values processed the gain adjustment are assumed as Vagc1, Vagc2, and Vagc3 in high sequence, and the level values of the input signals corresponding to them are assumed as Vin1, Vin2, and Vin3 in sequence.

When a level value of the input signal is output, the controller 16 serves as a gain control signal output means, and outputs a gain control signal for controlling the gain of the variable amplifier 24 of the multi-directional antenna 2 on the basis of the detection result of the level of the TV broadcast signal (S6). Specifically, the ROM of the controller 16 stores a plurality of look-up tables, in which relationships between levels of input signals and expected voltages of TV broadcast signals after changing the gain corresponding to each value or step number of adjustable gain of the variable amplifier 24 of the multi-directional antenna 2, is written. The ROM of the controller 16 further stores a maximum value $V_{MAX}$ and a minimum value $V_{MIN}$ of the voltage of the TV broadcast signal which can be processed properly in the ATSC front end 12 and the MPEG decoder 13. Then, the controller 16 refers the look-up tables on the basis of the level of the input signal, and decides a value or a step number of the gain from a look-up table showing the largest value corresponding to the level of the input signal between the maximum value $V_{MAX}$ and the minimum value $V_{MIN}$ of the voltage of the TV broadcast signal which can be processed properly among a plurality of expected voltages of the TV broadcast signals, and outputs a gain control signal corresponding to the value or the step number of the gain.

Figure 4:
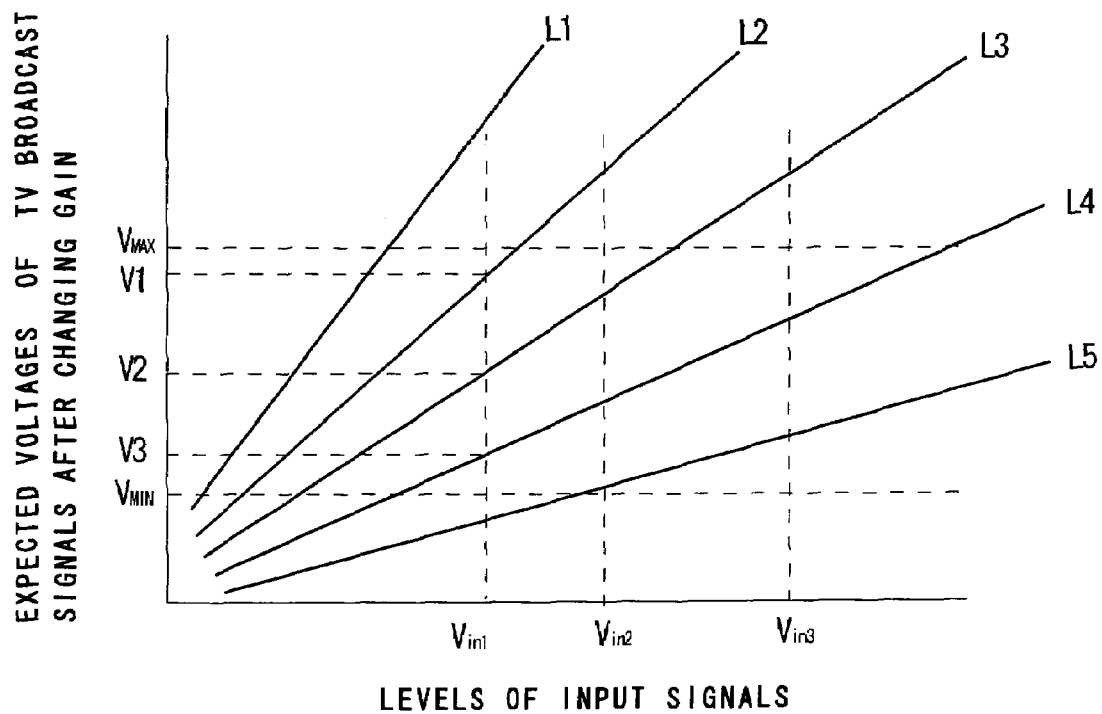
FIG. 4 is a graph showing relations between levels of input signals and forecasted voltages of TV broadcast signals after changing gain corresponding to values or a step number of the gain which is changeable in a variable amplifier of a multi-directional antenna in the above-mentioned embodiment.

Hereupon, the levels of input signals and the expected voltage values of the TV broadcast signals after changing the gain corresponding to the levels of input signals are set in each look-up table with following to one of a plurality of characteristic curves (or straight lines) corresponding to the values or step numbers of the adjustable gain of the variable amplifier 24 of the multi-directional antenna 2, for example, shown in FIG. 4. In FIG. 4, the ordinate designates the expected voltage values of the TV broadcast signals after changing the gain, and the abscissa designates the level values of the input signals. For example, when the level value of the input signal is assumed as $V_{in1}$, three values V1, V2 and V3 on the characteristic curves L2 to L4 among five values on the characteristic curves L1 to L5 corresponding to the level value of the input signal $V_{in1}$ are included between the maximum value $V_{MAX}$ and the minimum value $V_{MIN}$ of the voltage of the TV broadcast signal which can be processed properly. The controller 16 decides a value or step number of the gain of the characteristic curve Le showing the value V1 which is the nearest to the maximum value $V_{MAX}$ among there three values V1, V2 and V3 as the value or the step number (second step) of the gain of the variable amplifier 24 to be changed. The number of the characteristic curves and the value of the gains of them can be established optionally. For example, the characteristic curve L3 may be established as a case that no gain is set to the variable amplifier 24 of the multi-directional antenna 2, that is, the received TV broadcast signal is directly outputted. The characteristic curves L1 and L2 may be established as cases that a positive value of the gain is set to the variable amplifier 24 of the multi-directional antenna 2, that is, the received TV broadcast signal is outputted after being amplified. Alternatively, the characteristic curves L3 and L4 may be established as cases that a negative value of the gain is set to the variable amplifier 24 of the multi-directional antenna 2, that is, the received TV broadcast signal is outputted after being damped.

The gain control signal is transmitted from the controller 16 to the multi-directional antenna 2 through the modular terminal 19 and the cable 4. When the control unit 22 of the multi-directional antenna 2 receives the gain control signal, the control unit 22 changes the gain of the variable amplifier 24 to the decided value or step number (S7). As a result, the level of the TV broadcast signal outputted from the multi-directional antenna 2 can be raised as higher as possible in the scope that can be processed with the TV broadcast signal receiver 1 properly, and S/N of the TV broadcast signal outputted from the multi-directional antenna 2 can be heightened. In addition, even if noise is superimposed on the TV broadcast signal while it is transmitted through the cable 4, the high S/N of the TV broadcast signal can be maintained when it is in inputted into the TV broadcast signal receiver 1. Especially, even though the level of the TV broadcast signal was lower near to the predetermined threshold when it was received by the multi-directional antenna 2, the level of the TV broadcast signal is amplified as higher as possible when it is outputted from the multi-directional antenna 2, so that the signal receiving condition becomes stable with no relation to the locations of the multi-directional antenna 2 and the TV broadcast signal receiver 1, the length of the cable 4, and so on. Thereby, a user can watch a TV broadcast of a channel that the user choose.

The present invention is not limited to the description of the above-mentioned embodiment. It is sufficient that the multi-directional antenna comprises a variable amplifier which can be controlled the gain adjustment from the TV broadcast signal receiver, and amplifies a received TV broadcast signal, and the TV broadcast signal receiver can detect a level of the TV broadcast signal outputted from the multi-directional antenna, and control the gain of the variable amplifier corresponding to the detected level. Furthermore, in the above-mentioned embodiment, the gain adjustment of the variable amplifier 24 of the multi-directional antenna 2 is performed at a time of switching the channel, as an example. The present invention, however, is not limited to this example. It is possible to configure that the level of the TV broadcast signal outputted from the multi-directional antenna can be detected and the gain of the variable amplifier is adjusted corresponding to the detected level at a predetermined constant time interval or irregular time intervals.

Still furthermore, the digital terrestrial TV broadcast signal receiver in accordance with the present invention is not limited to the set-top box for receiving the digital terrestrial TV broadcast signal, and it may be a TV receiver or a DVD recorder having a tuner function.

This application is based on Japanese patent application 2005-9639 filed Jan. 17, 2005 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A digital terrestrial TV broadcast signal receiving system comprising a multi-directional antenna and a TV broadcast signal receiver which are connected by a cable, wherein the multi-directional antenna has a variable amplifier which can be controlled gain adjustment from the TV broadcast signal receiver, and amplifies a received TV broadcast signal; and the TV broadcast signal receiver detects a level of the TV broadcast signal outputted from the multi-directional antenna, and controls the gain of the variable amplifier corresponding to the detected level by accessing at least one look-up table stored in the TV broadcast receiver and outputting a gain control signal obtained from the look-up table, wherein the at least one look-up table includes a relationship between levels of input signals and expected voltages of TV broadcast signals after changing the gain, and a maximum value of the voltage of the TV broadcast signal that can be processed properly by the TV broadcast signal receiver.

2. The digital terrestrial TV broadcast signal receiving system in accordance with claim 1, wherein the TV broadcast signal receiver further stores a plurality of look-up tables, in which relationships between levels of input signals and expected voltages of TV broadcast signals after changing the gain corresponding to each value or step number of adjustable gain of the variable amplifier of the multi-directional antenna, is written, a maximum value and a minimum value of the voltage of the TV broadcast signal which can be processed properly in the TV broadcast receiver, refers the look-up tables based on the level of the input signal, decides a value or a step number of the gain from a look-up table showing the largest value corresponding to the level of the input signal between the maximum value and the minimum value of the voltage of the TV broadcast signal which can be processed properly among a plurality of expected voltages of the TV broadcast signals, and outputs a gain control signal corresponding to the value or the step number of the gain, thereby the gain of the variable amplifier of the multi-directional antenna can be controlled.

3. A digital terrestrial TV broadcast signal receiving system comprised of a multi-directional antenna and a TV broadcast signal receiver which are connected by a cable, wherein the multi-directional antenna has:

a signal receiving direction selecting means for selecting one signal receiving direction among a plurality of signal receiving directions based on a signal receiving direction control signal outputted from the TV broadcast signal receiver; and a variable amplifying means which can be controlled gain adjustment by a signal receiving direction control signal outputted from the TV broadcast signal receiver, and amplifies a received TV broadcast signal; and the TV broadcast signal receiver has:

a TV broadcast signal receiving means connected to the multi-directional antenna through the cable, and receiving a TV broadcast signal;

a TV broadcast signal processing means performing a predetermined signal processing to the TV broadcast signal received by the TV broadcast signal receiving means;

a TV broadcast signal output means outputting the TV broadcast signal processed by the TV broadcast signal processing means to a monitor apparatus;

a memory means temporarily memorizing the TV broadcast signal processed by the TV broadcast signal processing means;

a signal receiving direction deciding means deciding an optimum signal receiving direction with respect to each receivable channel with using information memorized in the memory means;

a signal receiving direction control signal output means outputting a signal receiving direction control signal to the multi-directional antenna for specifying an effective signal receiving direction to receive the TV broadcast signal;

a signal level detection means detecting a level of the TV broadcast signal received by the TV broadcast signal receiving means;

a gain control signal output means outputting a gain control signal for controlling a gain of the variable amplifying means of the multi-directional antenna based on a result of detection of the level of the TV broadcast signal by the signal level detection means;

an entire control means controlling each component of the TV broadcast signal receiver; and the signal level detection means stores a look-up table in which a relation between voltages of TV broadcast signals and signal levels corresponding to them, refers the look-up table based on the received TV broadcast signal and outputs a signal level corresponding to the received TV broadcast signal;

the gain control signal output means stores a plurality of look-up tables, in which relationships between levels of input signals and expected voltages of TV broadcast signals after changing the gain corresponding to each value or step number of adjustable gain of the variable amplifier of the multi-directional antenna, is written, a maximum value and a minimum value of the voltage of the TV broadcast signal which can be processed properly in the TV broadcast signal processing means, refers the look-up tables based on the level of the input signal, decides a value or a step number of the gain from a look-up table showing the largest value corresponding to the level of the input signal between the maximum value and the minimum value of the voltage of the TV broadcast signal which can be processed properly among a plurality of expected voltages of the TV broadcast signals, and outputs a gain control signal corresponding to the value or the step number of the gain; and thereby, the level of the TV broadcast signal outputted from the multi-directional antenna can be raised as higher as possible in a scope that can be processed with the TV broadcast signal receiver properly, and S/N of the TV broadcast signal outputted from the multi-directional antenna can be heightened, so that the signal receiving condition becomes stable with no relation to the locations of the multi-directional antenna and the TV broadcast signal receiver, the length of the cable.

4. A digital terrestrial TV broadcast signal receiver connected to a multi-directional antenna having a variable amplifier which can be controlled gain adjustment from the TV broadcast signal receiver, and amplifies a received TV broadcast signal; wherein the TV broadcast signal receiver detects a level of the TV broadcast signal outputted from the multi-directional antenna, and controls the gain of the variable amplifier corresponding to the detected level by accessing at least one look-up table stored in the TV broadcast receiver and outputting a gain control signal obtained from the look-up table, wherein the at least one look-up table includes a relationship between levels of input signals and expected voltages of TV broadcast signals after changing the gain, and a maximum value of the voltage of the TV broadcast signal that can be processed properly by the TV broadcast signal receiver.

5. The digital terrestrial TV broadcast signal receiver in accordance with claim 4, wherein the TV broadcast signal receiver further stores a plurality of look-up tables, in which relationships between levels of input signals and expected voltages of TV broadcast signals after changing the gain corresponding to each value or step number of adjustable gain of the variable amplifier of the multi-directional antenna, is written, a maximum value and a minimum value of the voltage of the TV broadcast signal which can be processed properly in the TV broadcast receiver, refers the look-up tables based on the level of the input signal, decides a value or a step number of the gain from a look-up table showing the largest value corresponding to the level of the input signal between the maximum value and the minimum value of the voltage of the TV broadcast signal which can be processed properly among a plurality of expected voltages of the TV broadcast signals, and outputs a gain control signal corresponding to the value or the step number of the gain, thereby the gain of the variable amplifier of the multi-directional antenna can be controlled.

6. A digital terrestrial TV broadcast signal receiver connected to a multi-directional antenna having a variable amplifying means which can be controlled gain adjustment from the TV broadcast signal receiver, and amplifies a received TV broadcast signal; wherein the TV broadcast signal receiver has:

a TV broadcast signal receiving means connected to the multi-directional antenna through the cable, and receiving a TV broadcast signal;

a TV broadcast signal processing means performing a predetermined signal processing to the TV broadcast signal received by the TV broadcast signal receiving means;

a TV broadcast signal output means outputting the TV broadcast signal processed by the TV broadcast signal processing means to a monitor apparatus;

a memory means temporarily memorizing the TV broadcast signal processed by the TV broadcast signal processing means;

a signal receiving direction deciding means deciding an optimum signal receiving direction with respect to each receivable channel with using information memorized in the memory means;

a signal receiving direction control signal output means outputting a signal receiving direction control signal to the multi-directional antenna for specifying an effective signal receiving direction to receive the TV broadcast signal;

a signal level detection means detecting a level of the TV broadcast signal received by the TV broadcast signal receiving means;

a gain control signal output means outputting a gain control signal for controlling a gain of the variable amplifying means of the multi-directional antenna based on a result of detection of the level of the TV broadcast signal by the signal level detection means;

an entire control means controlling each component of the TV broadcast signal receiver; and the signal level detection means stores a look-up table in which a relation between voltages of TV broadcast signals and signal levels corresponding to them, refers the look-up table based on the received TV broadcast signal and outputs a signal level corresponding to the received TV broadcast signal;

the gain control signal output means stores a plurality of look-up tables, in which relationships between levels of input signals and expected voltages of TV broadcast signals after changing the gain corresponding to each value or step number of adjustable gain of the variable amplifier of the multi-directional antenna, is written, a maximum value and a minimum value of the voltage of the TV broadcast signal which can be processed properly in the TV broadcast signal processing means, refers the look-up tables based on the level of the input signal, decides a value or a step number of the gain from a look-up table showing the largest value corresponding to the level of the input signal between the maximum value and the minimum value of the voltage of the TV broadcast signal which can be processed properly among a plurality of expected voltages of the TV broadcast signals, and outputs a gain control signal corresponding to the value or the step number of the gain; and thereby, the level of the TV broadcast signal outputted from the multi-directional antenna can be raised as higher as possible in a scope that can be processed with the TV broadcast signal receiver properly, and S/N of the TV broadcast signal outputted from the multi-directional antenna can be heightened, so that the signal receiving condition becomes stable with no relation to the locations of the multi-directional antenna and the TV broadcast signal receiver, the length of the cable.

* * * * *